United States Patent
Zeng et al.

(10) Patent No.: US 11,558,343 B2
(45) Date of Patent: Jan. 17, 2023

(54) METHOD AND APPARATUS FOR RESOLVING DOMAIN NAME BASED ON CO-GOVERNANCE CHAIN

(71) Applicant: CHINA INTERNET NETWORK INFORMATION CENTER, Beijing (CN)

(72) Inventors: Yu Zeng, Beijing (CN); Hongtao Li, Beijing (CN); Anlei Hu, Beijing (CN); Kejun Dong, Beijing (CN); Zhiwei Yan, Beijing (CN); Xue Yang, Beijing (CN); Haikuo Zhang, Beijing (CN); Zhiyong Zhang, Beijing (CN)

(73) Assignee: CHINA INTERNET NETWORK INFORMATION CENTER, Beijing (CN)

( * ) Notice: Subject to any disclaimer, the term of this patent is extended or adjusted under 35 U.S.C. 154(b) by 0 days.

(21) Appl. No.: 17/250,225

(22) PCT Filed: Oct. 15, 2020

(86) PCT No.: PCT/CN2020/121069
§ 371 (c)(1),
(2) Date: Jul. 7, 2021

(87) PCT Pub. No.: WO2022/067888
PCT Pub. Date: Apr. 7, 2022

(65) Prior Publication Data
US 2022/0103512 A1    Mar. 31, 2022

(30) Foreign Application Priority Data
Sep. 30, 2020 (CN) .......................... 202011057496.8

(51) Int. Cl.
*G06F 15/16* (2006.01)
*H04L 61/4511* (2022.01)
(Continued)

(52) U.S. Cl.
CPC ........ *H04L 61/4511* (2022.05); *H04L 63/101* (2013.01); *H04L 67/10* (2013.01)

(58) Field of Classification Search
CPC ..... H04L 61/1511; H04L 63/101; H04L 67/10
See application file for complete search history.

(56) References Cited

U.S. PATENT DOCUMENTS

| 2016/0191243 | A1 | 6/2016 | Manning |
| 2017/0134428 | A1* | 5/2017 | Vazquez Carames ....................... H04L 63/0245 |
| 2019/0166085 | A1* | 5/2019 | Li ....................... H04L 61/1535 |

FOREIGN PATENT DOCUMENTS

| CN | 107613041 A | 1/2018 |
| CN | 108064444 A | 5/2018 |

(Continued)

OTHER PUBLICATIONS

International Search Report and Written Opinion dated Jun. 21, 2021, in related PCT Application No. PCT/CN2020/121069.
(Continued)

*Primary Examiner* — Padma Mundur
(74) *Attorney, Agent, or Firm* — Maschoff Brennan (57) ABSTRACT

Provided are a method and an apparatus for resolving a domain name based on a co-governance chain. The method includes: determining data distribution nodes, and constructing a root domain name co-governance chain based on the data distribution nodes; obtaining trusted root zone data based on the root domain name co-governance chain, and constructing a co-governance root service based on the trusted root zone data; and resolving a domain name by applying a recursive resolution mode based on the co-governance root service and corresponding data in the root domain name co-governance chain, in response to receiving a domain name resolution request. With the root domain name co-governance chain, a decentralized processing mode (Continued)

is used, nodes are equal, and it is only required to make an adjustment in a certain node upon resolving a domain name, thereby avoiding risks such as single point management and centralization.

6 Claims, 6 Drawing Sheets

(51) Int. Cl.
*H04L 9/40* (2022.01)
*H04L 67/10* (2022.01)

(56) References Cited

FOREIGN PATENT DOCUMENTS

| CN | 108366138 A | 8/2018 |
| --- | --- | --- |
| CN | 108833603 A | 11/2018 |
| CN | 109327562 A | 2/2019 |
| CN | 109672760 A | 4/2019 |

OTHER PUBLICATIONS

Chinese Office Action dated Jun. 2, 2021, in priority Chinese Application No. 202011057496.8.

* cited by examiner

METHOD AND APPARATUS FOR RESOLVING DOMAIN NAME BASED ON CO-GOVERNANCE CHAIN

This application is the national phase of International Application No. PCT/CN2020/121069, titled "METHOD AND APPARATUS FOR RESOLVING DOMAIN NAME BASED ON CO-GOVERNANCE CHAIN," filed on Oct. 15, 2020, which claims priority to Chinese Patent Application No. 202011057496.8, titled "METHOD AND APPARATUS FOR RESOLVING DOMAIN NAME BASED ON CO-GOVERNANCE CHAIN," filed on Sep. 30, 2020 with the China National Intellectual Property Administration (CNIPA), which is incorporated herein by reference in its entirety.

TECHNICAL FIELD

The present disclosure relates to the technical field of block chains, and in particular to a method and an apparatus for resolving a domain name based on a co-governance chain.

BACKGROUND

Figure 1:
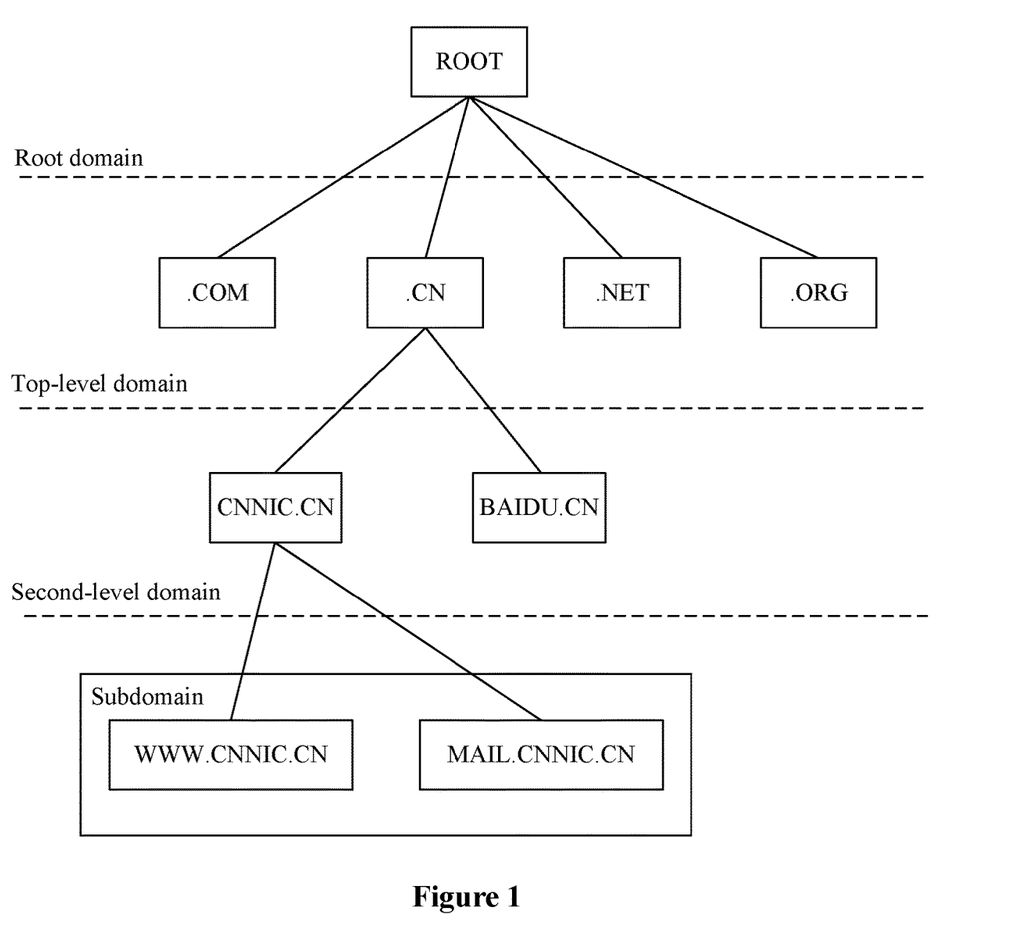
FIG. 1 is a schematic diagram of a domain name resolution architecture according to the conventional technology.

In the current Domain Name Server (DNS), namespace structure, domain name allocation and resolution process are all strictly hierarchical. As shown in FIG. 1, a domain name hierarchy includes a root domain, a top-level domain (e.g., .com, .cn, .org and .net) and a second-level domain (e.g., CNNIC.CN and BAIDU.CN). The CNNIC.CN further includes subdomains WWW.CNNIC.CN and MAIL.CNNIC.CN. The root resolution system is a starting point for domain name resolution and is the center of the system structure. At present, root zone data management is mainly handled by an Internet Assigned Numbers Authority, and domain name resolution is performed in a centralized management mode.

After studying the conventional centralized management process, it is found that in the centralized management mode, the domain name data management requires determination from the Internet Assigned Numbers Authority, resulting in risks such as single point management and centralization.

SUMMARY

In view of the above, a method and an apparatus for resolving a domain name based on a co-governance chain are provided in the present disclosure, to solve the problem that a domain name resolution requires determination from the Internet Assigned Numbers Authority in the conventional centralized management mode which will result in single point management, centralization and other risks. The specific solutions are as follows.

A method for resolving a domain name based on a co-governance chain includes:

determining data distribution nodes, and constructing a root domain name co-governance chain based on the data distribution nodes;

obtaining trusted root zone data based on the root domain name co-governance chain, and constructing a co-governance root service based on the trusted root zone data; and resolving a domain name by applying a recursive resolution mode based on the co-governance root service and corresponding data in the root domain name co-governance chain, in response to receiving a domain name resolution request.

In an embodiment, in the above method, the determining data distribution nodes and constructing a root domain name co-governance chain based on the data distribution nodes includes:

determining each of the data distribution nodes in the root domain name co-governance chain based on a country code top-level domain system and a generic top-level domain system;

obtaining top-level domain data, blacklist data and whitelist data; and backing up the top-level domain data, the blacklist data and the whitelist data to each of the data distribution nodes, to construct the root domain name co-governance chain.

In an embodiment, in the above method, the obtaining trusted root zone data based on the root domain name co-governance chain and constructing a co-governance root service based on the trusted root zone data includes:

synchronizing the trusted root zone data to the co-governance root service via the data distribution nodes in the root domain name co-governance chain;

setting a recursive resolution service mode in the co-governance root service; and configuring a DNS security extension function in the co-governance root service.

In an embodiment, in the above method, the resolving a domain name by applying a recursive resolution mode based on the co-governance root service and corresponding data in the root domain name co-governance chain in response to receiving a domain name resolution request comprises:

obtaining an IP address comprised in the domain name resolution request, in response to receiving the domain name resolution request;

transmitting a resolution request to the co-governance root service when the IP address is not found by a recursive server; and transmitting a resolution request to the root domain name co-governance chain when the IP address is not found by the co-governance root service, obtaining top-level authoritative domain information associated with the IP address, and feeding back the top-level authoritative domain information.

In an embodiment, the above method further includes:

obtaining a service corresponding to the IP address upon finding the IP address.

In an embodiment, the above method further includes:

obtaining unbacked-up data from an Internet Assigned Numbers Authority; and backing up the unbacked-up data to the root domain name co-governance chain.

An apparatus for resolving a domain name based on a co-governance chain includes:

a determination and construction module, configured to determine data distribution nodes and construct a root domain name co-governance chain based on the data distribution nodes;

a construction module, configured to obtain trusted root zone data based on the root domain name co-governance chain and construct a co-governance root service based on the trusted root zone data; and a resolution module, configured to resolve a domain name by applying a recursive resolution mode based on the co-governance root service and corresponding data in the root domain name co-governance chain, in response to receiving a domain name resolution request.

In an embodiment, in the above apparatus, the determination and construction module includes:

a determination unit, configured to determine each of the data distribution nodes in the root domain name co-governance chain based on a country code top-level domain system and a generic top-level domain system;

an acquisition unit, configured to obtain top-level domain data, blacklist data and whitelist data; and a backup unit, configured to back up the top-level domain data, the blacklist data and the whitelist data to each of the data distribution nodes, to construct the root domain name co-governance chain.

In an embodiment, in the above apparatus, the construction module comprises:

a synchronization unit, configured to synchronize the trusted root zone data to the co-governance root service via the data distribution nodes in the root domain name co-governance chain;

a mode configuration unit, configured to set a recursive resolution service mode in the co-governance root service; and a function configuration unit, configured to configure a DNS security extension function in the co-governance root service.

In an embodiment, in the above apparatus, the resolution module includes:

an acquisition unit, configured to obtain an IP address comprised in the domain name resolution request in response to receiving the domain name resolution request;

a first transmission unit, configured to transmit a resolution request to the co-governance root service when the IP address is not found by a recursive server; and an acquisition and feedback unit, configured to transmit a resolution request to the root domain name co-governance chain when the IP address is not found by the co-governance root service, obtain top-level authoritative domain information associated with the IP address, and feedback the top-level authoritative domain information.

Compared with the conventional technology, the present disclosure has the following advantages.

A method and an apparatus for resolving a domain name based on a co-governance chain are provided in the present disclosure. The method includes: determining data distribution nodes, and constructing a root domain name co-governance chain based on the data distribution nodes; obtaining trusted root zone data based on the root domain name co-governance chain, and constructing a co-governance root service based on the trusted root zone data; and resolving a domain name by applying a recursive resolution mode based on the co-governance root service and corresponding data in the root domain name co-governance chain, in response to receiving a domain name resolution request. With the above resolution method, a root domain name co-governance chain is constructed based on blockchain technology, without performing centralized management by the Internet Assigned Numbers Authority. With the root domain name co-governance chain, a decentralized processing mode is used, each node is equal, and it is only required to make an adjustment in a certain node upon resolving a domain name, thereby avoiding the risks, such as single point management and centralization.

BRIEF DESCRIPTION OF THE DRAWINGS

The drawings to be used in the description of the embodiments or the conventional technology are described briefly as follows, so that the technical solutions in the embodiments of the present disclosure or the conventional technology are clearly illustrated. It is apparent that the drawings in the following description only illustrate some embodiments of the present disclosure. For those skilled in the art, other drawings may be obtained based on these drawings without any creative work.

DETAILED DESCRIPTION OF THE EMBODIMENTS

The technical solution according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative work fall within the protection scope of the present disclosure.

With the above descriptions of the disclosed embodiments, the skilled in the art may practice or use the present disclosure. Various modifications to the embodiments are apparent for the skilled in the art. The general principle defined herein may be implemented in other embodiments without departing from the spirit or scope of the present disclosure. Therefore, the present disclosure should not be limited to the embodiments disclosed herein, but has the widest scope in accordance to the principle and the novel features disclosed herein.

A method and an apparatus for resolving a domain name based on a co-governance chain are provided in the present disclosure, and may be applied in a domain name resolution process. In the current Domain Name Server (DNS), namespace structure, domain name allocation and resolution process are all strictly hierarchical. The root resolution system is a starting point for domain name resolution and is the center of the system structure. At present, root zone data management is mainly handled by an Internet Assigned Numbers Authority, which makes a centralized management on the domain name resolution process. The centralized management mode requires a determination from the Internet Assigned Numbers Authority, upon resolving a domain name, thereby resulting in a cumbersome domain name resolution process. Furthermore, 13 root servers and their mirror servers are run by 12 organizations, thus it is difficult to support and meet the cyberspace management trend of openness and interconnection of global internet and multi-party co-governance, and it is also not conducive to safeguarding the cyberspace sovereignty of countries around the world.

To solve the above problems, in the present disclosure, a domain name resolution architecture is constructed based on blockchain technology. The blockchain is a new application mode of computer technologies such as distributed data storage, point-to-point transmission, consensus mechanism and encryption algorithm. The blockchain technology may use block chain data structure to verify and store data, use distributed node consensus algorithm to generate and update data, use cryptography to ensure the security of data transmission and data access, and use automatic script codes (smart contracts) to program and operate data, and the blockchain is a new decentralized infrastructure and distributed storage system. There is no central node in the blockchain, all nodes are equal, and consistency of data at each of the nodes is ensured by using cryptography and consensus mechanism.

The characteristics of the blockchain are mainly reflected in the following three aspects:

Decentralization. In a blockchain network, all nodes are equal to each other and are not controlled by a certain single node, or an individual or organization. Data of the blockchain is stored on multiple nodes in the network, which is very different from that data is stored on one or several nodes according to the conventional technology.

Information cannot be tampered with. When each transaction in the blockchain reaches a node in the blockchain, the node will verify a signature of the transaction. If the signature is incorrect, data will be discarded. Only the user with a private key can modify the transaction, and other users cannot modify the transaction. The blockchain is a chain formed by linearly connecting blocks. Data cannot be tampered with, which is guaranteed by cryptography, hash function, and the like.

Information can be traced. A hash value of each block in the blockchain identifies a transaction, thereby forming an interconnected chain structure. Therefore, the blockchain contains all the transactions that have occurred in the entire blockchain network, and each new transaction is generated on a basis of an original transaction. Based on the continuity between transactions, each transaction can be traced to a source, to verify the legality of the transaction.

Therefore, how to design an algorithm compatible with the conventional business logic to achieve a decentralized, equal and open name system and support diversified security and business supervision is still a big research challenge. In particular, the design of a new domain name root resolution system based on blockchain from the perspective of architecture is an application field that the current DNS technology research and governance community and the blockchain practitioners are concerned about. The new system also poses new challenges to efficient and reliable storage management and accurate security incident analysis. Based on the decentralization concept of the blockchain, the system innovation in the field of domain name root resolution is not only an improvement in the efficiency, the scalability, and the response to the increasing large-scale Distributed Denial of Service (DDoS) attacks in the conventional centralized service architecture, and but also is conducive to safeguarding the cyberspace sovereignty of countries around the world.

Figure 2:
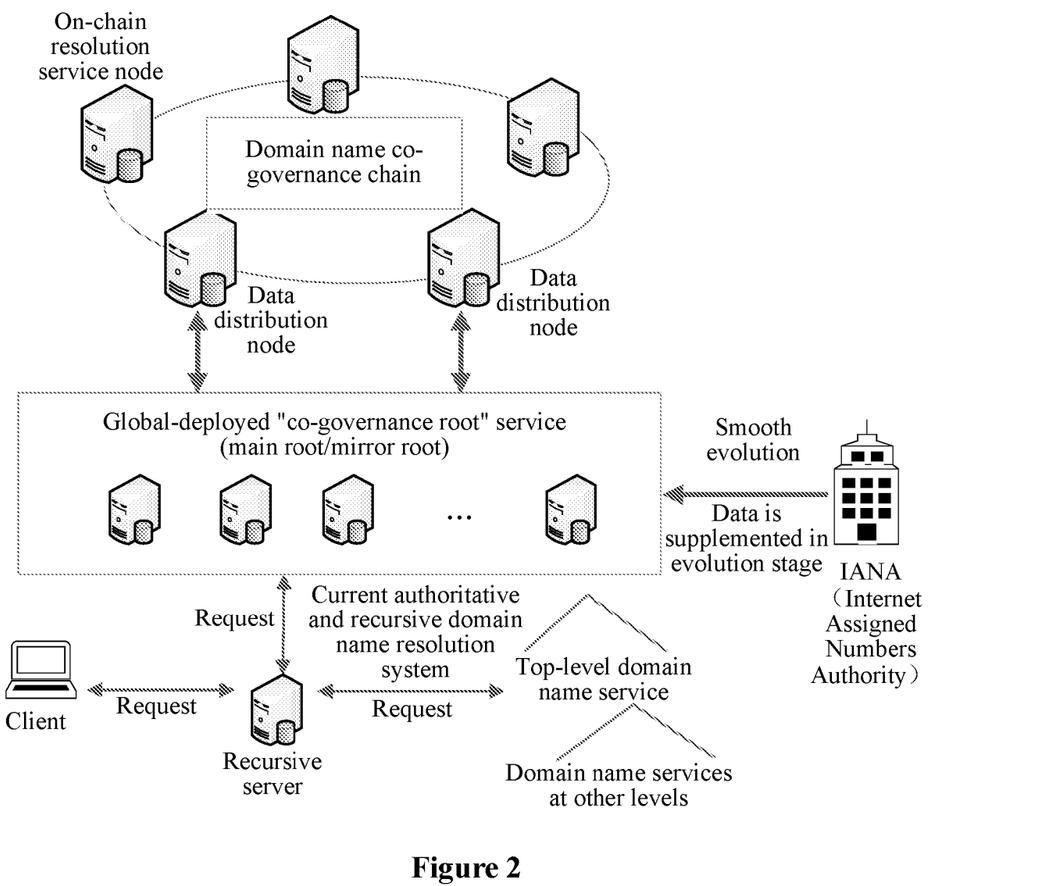
FIG. 2 is a schematic diagram of a domain name resolution architecture according to an embodiment of the present disclosure.

It is very important to construct, based on the blockchain technology, a new root domain name and an authoritative domain name resolution system architecture, a protocol and a standard which are decentralized, participated by multiple parties, equal, open, and supervisable. To achieve this goal, a resolution architecture as shown in FIG. 2 is proposed. In the architecture, (1) a co-governance chain is designed to achieve a new root domain name data management system which is decentralized, participated by multiple parties, endogenous security, and supervisable, where the co-governance chain includes multiple data distribution nodes;

(2) a co-governance root is proposed to realize a new root service system which is equal, open, efficient, scalable, compatible and evolvable, and a secure and reliable data support is provided for the co-governance root by the data distribution nodes on the co-governance chain, where the co-governance root is a global-deployed co-governance root service (main root/mirror root);

(3) a domain name resolution protocol, including a co-governance root and an enhanced recursive node, is designed to meet domain name resolution requirements such as high efficiency and security, user transparency, and compatible evolution, where the enhanced recursive node is a recursive server for transferring a request between a client and a global co-governance root service (e.g., a top-level authoritative domain name service, and authoritative domain name services at other levels); and (4) data is supplemented in an evolution stage by the Internet Assigned Numbers Authority (IANA), to achieve smooth evolution.

With the new domain name resolution system, the cyberspace sovereignty of various countries can be safeguarded, and the multi-party co-governance management mode for the Internet can be effectively supported technically. The new domain name resolution system is compatible with the conventional domain name resolution system. In addition, network experimental verification for the business, performance and security of the new domain name resolution system can be performed. The new domain name resolution system is suitable for gradual deployment and evolution in stages without changing an operation mode of the conventional authoritative and recursive resolution infrastructure, to finally realize a new domain name service system with multilateral and multi-party co-governance and supervision.

Figure 3:
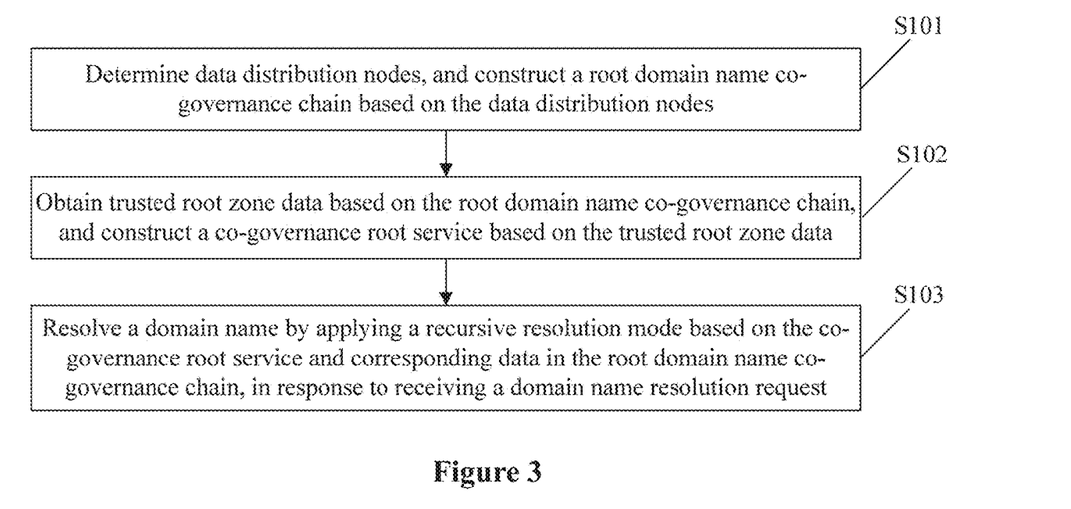
FIG. 3 is a flow chart of a method for resolving a domain name based on a co-governance chain according to an embodiment of the present disclosure.

Based on the above problems, a method for resolving a domain name based on a co-governance chain is provided in the present disclosure. FIG. 3 shows an execution process of the resolution method. The method includes following steps S101 to S103.

In step S101, data distribution nodes are determined, and a root domain name co-governance chain is constructed based on the data distribution nodes.

In an embodiment of the present disclosure, the domain name system includes a country code top-level domain (ccTLD) system and a generic top-level domain (gTLD) system. In the country code top-level domain (ccTLD) system, each node is a country code top-level domain management agency. In the generic top-level domain (gTLD) system, each node is a commercial organization. Therefore, two committees are defined, that is, a ccTLD committee and a gTLD committee. The ccTLD committee is responsible for vote initiation and admittance related to the country code top-level domain, and the gTLD committee is responsible for vote initiation and admittance related to the generic top-level domain.

Figure 6:
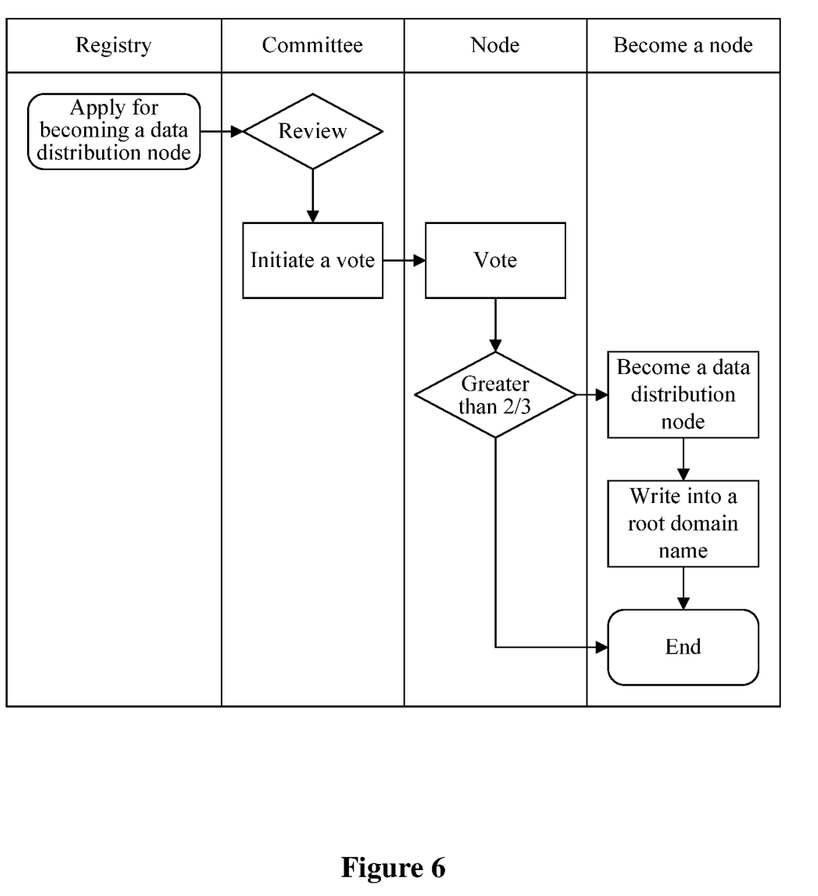
FIG. 6 shows a process of determining a data distribution node according to an embodiment of the present disclosure.

FIG. 6 shows the process of determining a data distribution node. A request to applying for becoming a data distribution node is sent to a registry. The committee (ccTLD committee or gTLD committee) reviews the request, and initiates a vote among nodes after the review is completed. If the number of votes allowing the node to join is greater than two-thirds of the total number of votes, the node is allowed to become a data distribution node. The node is written into the root domain name co-governance chain, and the process of determining a data distribution node ends.

Figure 4:
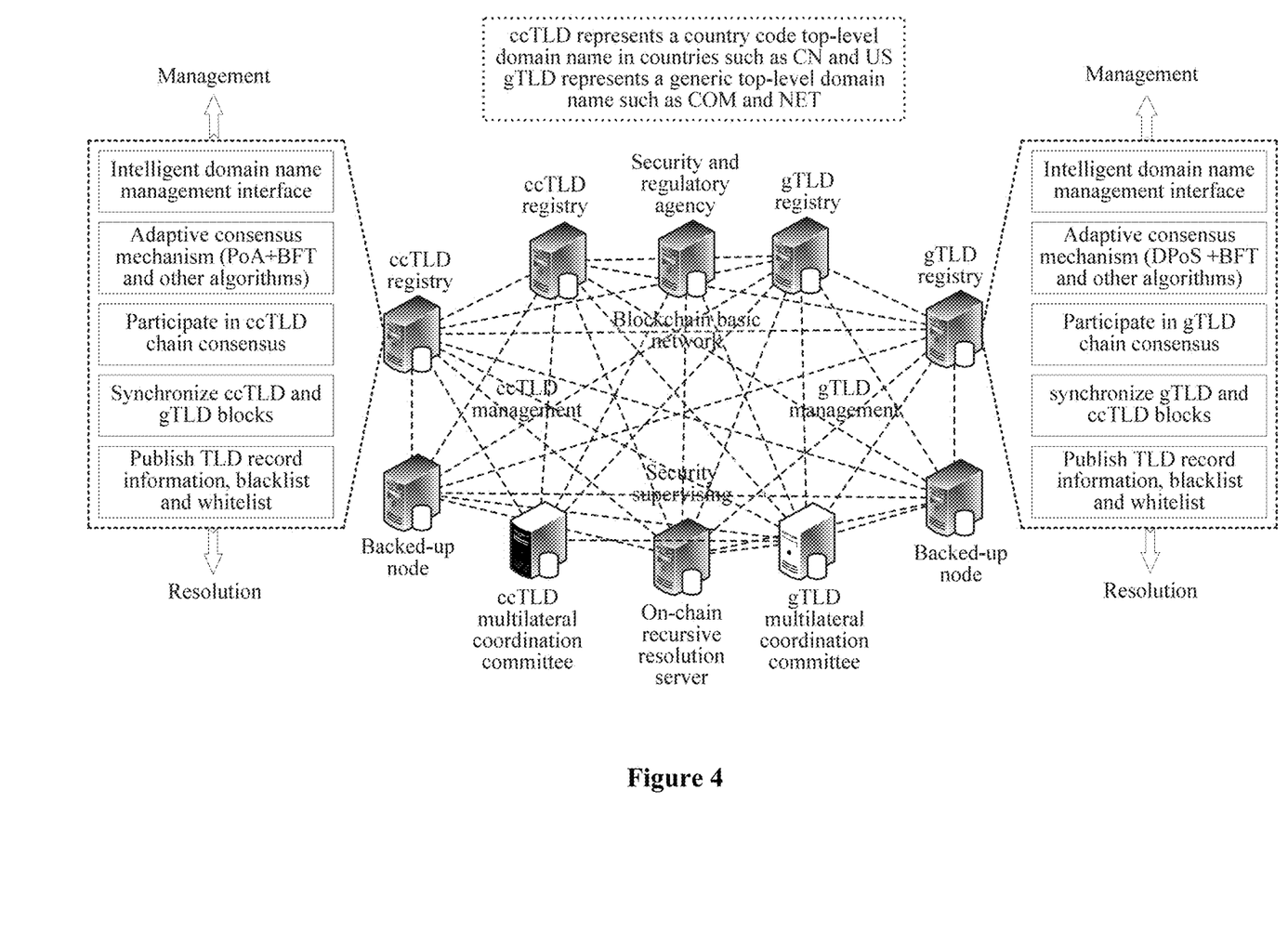
FIG. 4 is a schematic structural diagram of a co-governance chain according to an embodiment of the present disclosure.

Further, it is to obtain multi-party co-governance root zone management on top-level domain data, blacklist data (e.g., a phishing domain name) and whitelist data (e.g., an important website domain name) by multi-roles including ccTLD registry, gTLD registry, security and regulatory agency and multilateral coordination committee. The top-level domain data, the blacklist data and the whitelist data are backed up to each data distribution node, to construct the root domain name co-governance chain. FIG. 4 shows a schematic structural diagram of the root domain name co-governance chain. The root domain name co-governance chain includes: a security and regulatory agency, a gTLD registry, a gTLD multilateral coordination committee, a ccTLD registry, a ccTLD multilateral coordination committee, an on-chain recursive resolution server, and data distribution nodes. The gTLD registry and the gTLD multilateral coordination committee are configured for gTLD management. The gTLD registry is configured to: provide an intelligent domain name management interface, perform hybrid consensus mechanism (PBFT-DPOA and other algorithms), participate in gTLD chain consensus, synchronize gTLD and ccTLD blocks, and publish TLD record information, blacklist and whitelist. The ccTLD registry and the ccTLD multilateral coordination committee are configured for ccTLD management. The ccTLD registry is configured to: provide an intelligent domain name management interface, perform hybrid consensus mechanism (PBFT-DPOA and other algorithms), participate in ccTLD chain consensus, synchronize gTLD and ccTLD blocks, and publish TLD record information, blacklist and whitelist. The PoA consensus algorithm is performed based on a value of an identity, indicating that a producer and a verifier of a block are selected depending on personal credibility and authority. The members of the system include various national domain name registries and some well-known gTLD registries. With regard to DPOA, 2N−1 node representatives for representing the system is generated by a voting mechanism, and only the 2N−1 nodes are used to generate a block. With regard to PBFT-DPOA, Byzantine Fault Tolerance (BFT) is a fault-tolerant technology in the field of distributed computing. Byzantine hypothesis is a model of the real world. Due to hardware errors, network congestion or interruption, and malicious attacks, computers and networks may exhibit unexpected behavior. The Byzantine Fault Tolerance technology is designed to handle the abnormal behaviors and meet the specifications of the problem to be solved. PBFT is the abbreviation of Practical Byzantine Fault Tolerance, that is, a Practical Byzantine Fault Tolerance Algorithm. The algorithm was proposed by Miguel Castro and Barbara Liskov in 1999, to solve the problem of low efficiency of the original Byzantine Fault Tolerance algorithm.

In step S102, trusted root zone data is obtained based on the root domain name co-governance chain, and a co-governance root service is constructed based on the trusted root zone data.

In an embodiment of the present disclosure, a "co-governance root" provides a root zone resolution function by obtaining trusted root zone data from the root domain name co-governance chain. The function mainly includes: firstly, support for the "co-governance root" to synchronize the latest data of the root zone via the data distribution nodes on the root domain name co-governance chain; and secondly, the "co-governance root" is designed to fully compatible with the current recursive resolution service mode. In an embodiment, it may be determined whether there is un-backed up TLD data in IANA, and the determination process may be based on an identifier, a time point, or other preferred determination method. The specific determination process is not limited in the embodiments of the present disclosure. If there is un-backed up TLD data in IANA, the TLD data may be supplemented from the IANA, to realize a smooth evolution of the structure of the co-governance root. Thirdly, DNSSEC function is supported.

In step S103, a domain name is resolved by applying a recursive resolution mode based on the co-governance root service and corresponding data in the root domain name co-governance chain, in response to receiving a domain name resolution request.

In an embodiment of the present disclosure, an enhanced recursive resolution node obtains the top-level domain name data, the domain name blacklist, and the domain name whitelist from the co-governance chain, to quickly respond to the domain name resolution request from the user. This enhanced recursive resolution node mainly functions for: quickly responding to the domain name resolution request from the user based on the domain name blacklist and the domain name whitelist, to improve the performance of recursive resolution on the domain name; obtaining an on-chain global top-level domain data, a domain name blacklist, and a domain name whitelist in real time from the root domain name co-governance chain; and for a domain name resolution request in which the domain name is not included in the domain name blacklist and the domain name whitelist, iteratively querying, as a general recursive server, a top-level domain name server.

The resolution process is described as follows. The client transmits a query request to the domain name server, that is, the recursive server. If the recursive server does not find an IP address of the queried domain name, the recursive server transmits a query request message to the co-governance root with a client's identity and performs a next query. If the co-governance root does not locally find information related to a top-level authoritative domain of the queried domain name, the co-governance root initiates a request to the root domain name co-governance chain (initiates a request to IANA simultaneously during a transition period), to obtain the information related to the top-level authoritative domain of the queried domain name.

After obtaining IP information of the top-level authoritative domain, the recursive server starts the top-level authoritative domain service for querying the IP address of the queried domain name, and returns the IP information of the queried domain name to the client after obtaining the IP address.

The client obtains the IP information of the queried domain name and accesses the corresponding service.

In addition, the top-level domain management agency publishes its root domain name and related resource records by its public and private key pairs, and writes its root domain name and related resource records in the co-governance chain. The co-governance root node receives a change notification about the root domain name record in the co-governance chain, and updates its local related records.

A method for resolving a domain name based on a co-governance chain is provided in the present disclosure. The method includes: determining data distribution nodes, and constructing a root domain name co-governance chain based on the data distribution nodes; obtaining trusted root zone data based on the root domain name co-governance chain, and constructing a co-governance root service based on the trusted root zone data; and resolving a domain name by applying a recursive resolution mode based on the co-governance root service and corresponding data in the root domain name co-governance chain, in response to receiving a domain name resolution request. With the above resolution method, a root domain name co-governance chain is constructed based on blockchain technology, without performing centralized management by the Internet Assigned Numbers Authority. With the root domain name co-governance chain, a decentralized processing mode is used, each node is equal, and it is only required to make an adjustment in a certain node upon resolving a domain name, thereby avoiding the risks, such as single point management and centralization.

In an embodiment of the present disclosure, a new root service system, which is equal, open, scalable and supervisable, can be realized by using the "co-governance root", a co-governance root data management system, which is decentralized, participated by multiple parties, endogenous security, and supervisable, can be realized by using the "root domain name co-governance chain", and a secure and reliable data support is provided for the co-governance root by the data distribution nodes on the root domain name co-governance chain. The root domain name co-governance chain includes a domain name registration management agency, a multilateral coordination committee, a security and regulatory agency, data distribution nodes, an on-chain resolution service agency, and the like, and supports multilateral and multipartite participation.

It is compatible with the current domain name system protocol and the existing massive infrastructure to realize a deployable implementation, that is, the co-governance root is deployed and evolved in stages, and a potential mode is as follows. In a first stage, a few TLDs are deployed and verified with IANA data as a supplement; in a second stage, most ccTLD data is managed by the co-governance root, and IANA synchronizes data from the co-governance root; and in a third stage, the co-governance root provides services independently.

Figure 5:
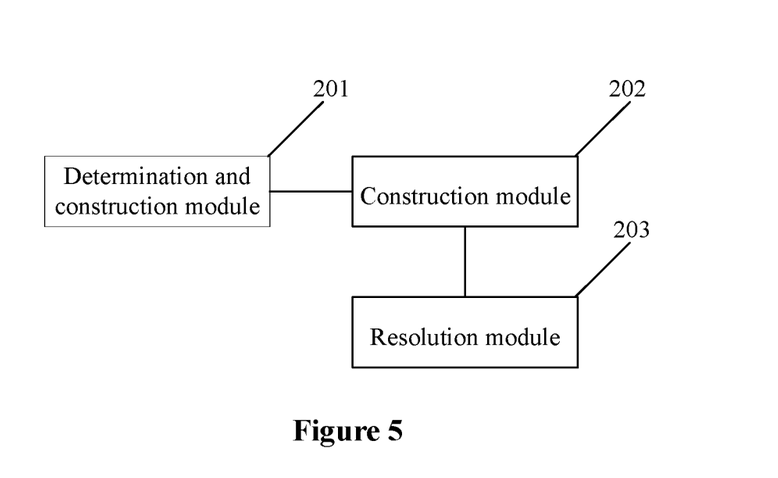
FIG. 5 is a schematic structural diagram of an apparatus for resolving a domain name based on a co-governance chain according to an embodiment of the present disclosure.

Based on the method for resolving a domain name based on a co-governance chain, an apparatus for resolving a domain name based on a co-governance chain is provided in an embodiment of the present disclosure. FIG. 5 shows a schematic structural diagram of the resolution apparatus. The apparatus includes: a determination and construction module 201, a construction module 202, and a resolution module 203.

The determination and construction module 201 is configured to determine data distribution nodes, and construct a root domain name co-governance chain based on the data distribution nodes.

The construction module 202 is configured to obtain trusted root zone data based on the root domain name co-governance chain, and construct a co-governance root service based on the trusted root zone data.

The resolution module 203 is configured to resolve a domain name by applying a recursive resolution mode based on the co-governance root service and corresponding data in the root domain name co-governance chain, in response to receiving a domain name resolution request.

An apparatus for resolving a domain name based on a co-governance chain is provided in the present disclosure. The apparatus is configured to: determine data distribution nodes, and construct a root domain name co-governance chain based on the data distribution nodes; obtain trusted root zone data based on the root domain name co-governance chain, and construct a co-governance root service based on the trusted root zone data; and resolve a domain name by applying a recursive resolution mode based on the co-governance root service and corresponding data in the root domain name co-governance chain, in response to receiving a domain name resolution request. With the apparatus according to the present disclosure, a root domain name co-governance chain is constructed based on blockchain technology, without performing centralized management by the Internet Assigned Numbers Authority. With the root domain name co-governance chain, a decentralized processing mode is used, each node is equal, and it is only required to make an adjustment in a certain node upon resolving a domain name, thereby avoiding the risks such as single point management and centralization.

In an embodiment of the present disclosure, the determination and construction module 201 includes: a determination unit 204, an acquisition unit 205, and a backup unit 206.

The determination unit 204 is configured to determine each of the data distribution nodes in the root domain name co-governance chain, based on a country code top-level domain system and a generic top-level domain system.

The acquisition unit 205 is configured to obtain top-level domain data, blacklist data and whitelist data.

The backup unit 206 is configured to back up the top-level domain data, the blacklist data and the whitelist data to each of the data distribution nodes, to construct the root domain name co-governance chain.

In an embodiment of the present disclosure, the construction module 202 includes: a synchronization unit 207, a mode configuration unit 208, and a function configuration unit 209.

The synchronization unit 207 is configured to synchronize the trusted root zone data to the co-governance root service via the data distribution nodes in the root domain name co-governance chain.

The mode configuration unit 208 is configured to set a recursive resolution service mode in the co-governance root service.

The function configuration unit 209 is configured to configure a DNS security extension function in the co-governance root service.

In an embodiment of the present disclosure, the resolution module 203 includes: an acquisition unit 210, a first transmission unit 211, and an acquisition and feedback unit 212.

The acquisition unit 210 is configured to obtain an IP address contained in the domain name resolution request, in response to receiving the domain name resolution request.

The first transmission unit 211 is configured to transmit a resolution request to the co-governance root service when the IP address is not found by a recursive server.

The acquisition and feedback unit 212 is configured to transmit a resolution request to the root domain name co-governance chain when the IP address is not found by the co-governance root service, obtain top-level authoritative domain information associated with the IP address, and feedback the top-level authoritative domain information.

It is noted that the embodiments in this specification are described in a progressive way. Each embodiment emphasizes the differences from others, and the same or similar parts among the embodiments can be referred to each other. Since the apparatus disclosed in the embodiments corresponds to the method therein, the description thereof is relatively simple, and for relevant parts, references may be made to the description in the method embodiment.

Finally, it should be further noted that the relationship terminologies such as "first", "second" and the like are only used herein to distinguish one entity or operation from another entity or operation, rather than to necessitate or imply that the actual relationship or order exists between the entities or operations. Furthermore, terms of "include", "comprise" or any other variants are intended to be non-exclusive. Therefore, a process, method, article, or device including multiple elements includes not only the elements but also other elements that are not enumerated, or also includes the elements inherent for the process, method, article or device. Unless expressively limited otherwise, the statement "comprising (including) a . . . " does not exclude the case that other similar elements may exist in the process, method, article or device including these elements.

For the convenience of description, the apparatus is divided into various units according to the functions and each unit is described separately. Apparently, in practicing the present disclosure, functions of the units may be implemented in a same or more software and/or hardware.

According to the embodiments described above, those skilled in the art can clearly know that the present disclosure may be implemented by means of software in conjunction with necessary general-purpose hardware platform. Based on such understanding, essential parts or parts contributing to the conventional technology of technical solutions of the present disclosure may be embodied as a software product. The computer software product may be stored in a storage medium, such as, a ROM/RAM, a magnetic disc, or an optical disk, and the computer software product includes multiple instructions for enabling a computer device (which may be a personal computer, a server, a network device or the like) to perform the methods described in various embodiments or some parts of the embodiments of the present disclosure.

A method and an apparatus for resolving a domain name based on a co-governance chain are described in detail hereinbefore. The principle and the implementation of the present disclosure are illustrated herein by specific examples. The above description in the embodiments is only intended to assist understanding the method and idea of the present disclosure. For those skilled in the art, modification may be made to the specific embodiment and application range according to the concept of the present disclosure. In summary, the contents of this specification should not be interpreted as a limitation to the present disclosure.

The invention claimed is:

1. A method for resolving a domain name based on a co-governance chain, comprising:
   determining a plurality of data distribution nodes based on a country code top-level domain system and a generic top-level domain system;
   obtaining top-level domain data, blacklist data and whitelist data;
   backing up the top-level domain data, the blacklist data and the whitelist data to each of the plurality of data distribution nodes, to construct a root domain name co-governance chain;
   obtaining trusted root zone data based on the root domain name co-governance chain, and constructing a co-governance root service based on the trusted root zone data;
   obtaining an IP address comprised in a domain name resolution request, in response to receiving the domain name resolution request;
   transmitting a resolution request to the co-governance root service when the IP address is not found by a recursive server; and
   transmitting a resolution request to the root domain name co-governance chain when the IP address is not found by the co-governance root service, obtaining top-level authoritative domain information associated with the IP address, and feeding back the top-level authoritative domain information.

2. The method according to claim 1, wherein the obtaining trusted root zone data based on the root domain name co-governance chain and constructing a co-governance root service based on the trusted root zone data comprises:
   synchronizing the trusted root zone data to the co-governance root service via the data distribution nodes in the root domain name co-governance chain;
   setting a recursive resolution service mode in the co-governance root service; and
   configuring a DNS security extension function in the co-governance root service.

3. The method according to claim 1, further comprising:
   obtaining a service corresponding to the IP address upon finding the IP address.

4. The method according to claim 1, further comprising:
   obtaining unbacked-up data from an Internet Assigned Numbers Authority; and
   backing up the unbacked-up data to the root domain name co-governance chain.

5. An apparatus for resolving a domain name based on a co-governance chain, comprising a processor and a non-transitory memory storing computer instructions, wherein the computer instructions when executed by the processor cause the processor to:
   determine a plurality of data distribution nodes based on a country code top-level domain system and a generic top-level domain system;
   obtain top-level domain data, blacklist data and whitelist data;
   back up the top-level domain data, the blacklist data and the whitelist data to each of the plurality of data distribution nodes, to construct a root domain name co-governance chain;
   obtain trusted root zone data based on the root domain name co-governance chain and construct a co-governance root service based on the trusted root zone data;
   obtain an IP address comprised in a domain name resolution request, in response to receiving the domain name resolution request;
   transmit a resolution request to the co-governance root service when the IP address is not found by a recursive server; and
   transmit a resolution request to the root domain name co-governance chain when the IP address is not found by the co-governance root service, obtain top-level authoritative domain information associated with the IP address, and feed back the top-level authoritative domain information.

6. The apparatus according to claim 5, wherein the computer instructions when executed by the processor further cause the processor to:
   synchronize the trusted root zone data to the co-governance root service via the data distribution nodes in the root domain name co-governance chain;
   set a recursive resolution service mode in the co-governance root service; and
   configure a DNS security extension function in the co-governance root service.

* * * * *